United States Patent
Suemitsu

(10) Patent No.: US 8,018,914 B2
(45) Date of Patent: Sep. 13, 2011

(54) RADIO COMMUNICATION DEVICE, DEMODULATION METHOD, AND FREQUENCY DEFLECTION CORRECTION CIRCUIT

(75) Inventor: Taisei Suemitsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 893 days.

(21) Appl. No.: 11/578,150

(22) PCT Filed: May 17, 2004

(86) PCT No.: PCT/JP2004/006638
§ 371 (c)(1),
(2), (4) Date: Oct. 10, 2006

(87) PCT Pub. No.: WO2005/112381
PCT Pub. Date: Nov. 24, 2005

(65) Prior Publication Data
US 2008/0279172 A1    Nov. 13, 2008

(51) Int. Cl.
*H04B 7/212* (2006.01)

(52) U.S. Cl. ........ 370/347; 370/322; 370/326; 370/328; 370/224; 370/249; 370/252; 370/324; 370/350; 370/215; 370/516; 370/503; 370/395.62; 375/221; 375/215; 375/376; 375/327; 375/294; 375/358; 375/252; 375/233; 375/350; 375/344; 375/368; 375/326; 455/13.2; 455/20; 455/21; 455/22; 455/23; 455/24; 455/42; 455/43; 455/63.3; 455/68; 455/69; 455/703; 455/70; 455/71; 455/75; 455/76; 455/77; 455/87; 455/112; 455/113; 455/126; 455/139

(58) Field of Classification Search .................. 370/322, 370/326, 328, 347, 350, 224, 249, 252, 503, 370/215, 516, 395.62, 324; 375/326, 350, 368, 344, 233, 252, 358, 294, 327, 376, 215, 221; 455/13.2, 20–24, 42–43, 63.8, 68, 69, 703, 70–71, 75–77, 87, 112–113, 126, 139
See application file for complete search history.

(56) References Cited

U.S. PATENT DOCUMENTS

| | | | | |
|---|---|---|---|---|
| 4,561,099 | A | * | 12/1985 | Atsugi et al. .................. 375/344 |
| 5,170,415 | A | * | 12/1992 | Yoshida et al. ............... 375/326 |
| 5,347,233 | A | * | 9/1994 | Ishibashi et al. .................. 331/2 |
| 5,612,977 | A | * | 3/1997 | Ogoro ........................... 375/344 |
| 5,822,011 | A | * | 10/1998 | Rumreich ..................... 348/549 |

(Continued)

FOREIGN PATENT DOCUMENTS

JP    2 222343    9/1990

(Continued)

*Primary Examiner* — Kamran Afshar
*Assistant Examiner* — Khalid Shaheed
(74) *Attorney, Agent, or Firm* — Oblon, Spivak, McClelland, Maier & Neustadt, L.L.P.

(57) ABSTRACT

A demodulation section 13 receives a TDMA-TDD based phase-modulated burst signal of mobile communications and demodulates the burst signal by a synchronous detection system (or a quasi-synchronous detection system). The demodulation section 13 includes a frequency deviation compensation section and a carrier recovery section each having a loop filter 14 with three or more stages of time constants. The time constants are switched by a selector switch 15 based on a control signal from a demodulation control section 16. This achieves quick pull-in and jitter after convergence is minimized, thereby allowing highly efficient performance of frequency deviation compensation, etc. that is required for synchronous detection (or quasi-synchronous detection) without increasing the size of circuit.

16 Claims, 10 Drawing Sheets

U.S. PATENT DOCUMENTS

| | | | |
|---|---|---|---|
| 5,845,196 A * | 12/1998 | Nawata | 455/71 |
| 5,889,767 A * | 3/1999 | Kimura | 370/314 |
| 6,727,763 B2 * | 4/2004 | Endo | 331/17 |
| 6,801,028 B2 * | 10/2004 | Kernahan et al. | 323/283 |
| 6,959,059 B1 * | 10/2005 | Yamazaki | 375/368 |
| 2003/0036361 A1 * | 2/2003 | Kawai et al. | 455/69 |
| 2003/0103488 A1 * | 6/2003 | Mitsume et al. | 370/350 |
| 2006/0067453 A1 * | 3/2006 | Duelk | 375/376 |

FOREIGN PATENT DOCUMENTS

| | | |
|---|---|---|
| JP | 5 335945 | 12/1993 |
| JP | 6 232926 | 8/1994 |
| JP | 7 46283 | 2/1995 |
| JP | 7 94984 | 4/1995 |
| JP | 7 336325 | 12/1995 |
| JP | 8-56159 | 2/1996 |
| JP | 8 56159 | 2/1996 |
| JP | 8-288971 | 11/1996 |
| JP | 8 288971 | 11/1996 |
| JP | 9 18533 | 1/1997 |
| JP | 9 307380 | 11/1997 |
| JP | 9-307380 | 11/1997 |
| JP | 11 340933 | 12/1999 |
| JP | 2000-174744 | 6/2000 |
| JP | 2003-018229 | 1/2003 |
| JP | 2003 209485 | 7/2003 |

* cited by examiner

RADIO COMMUNICATION DEVICE, DEMODULATION METHOD, AND FREQUENCY DEFLECTION CORRECTION CIRCUIT

TECHNICAL FIELD

The present invention relates to a radio communication apparatus and a demodulation method of the apparatus, and more specifically to a reception apparatus that is installed in a mobile communication base station used in a communication system based on a Time Division Multiple Access (TDMA)—Time Division Duplex (TDD) system, for example.

BACKGROUND ART

In mobile communications, demodulation using synchronous detection (quasi-synchronous detection) requires, in addition to a carrier recovery circuit, highly efficient circuits for frequency deviation compensation and for bitclock recovery in order to achieve an accurate carrier recovery.

When a carrier recovery circuit, a frequency deviation compensation circuit, and a bitclock recovery circuit each use a loop filter, the value of a time constant to be used for the loop filter is selected so that an output result from the loop filter becomes an optimum value of convergence.

In a receiving section of radio communication, when a received frame (slot) is asynchronous, then it is desirable to have quick pull-in. A small value is therefore suitable of the time constant. When a received frame is synchronous, then there is no need for having quick pull-in. It is then desirable to improve the accuracy of convergence value of pull-in. A large value is therefore suitable of the time constant in order to have a longer duration of averaging.

If each loop filter is provided with a single value of a time constant, then an output result from the loop filter does not become an optimum convergence value, particularly in a reception process of radio communications involving such a transition from an asynchronous state to a synchronous state. This is because an optimum value of a time constant required for the filter depends on whether a received frame (slot) is synchronous or asynchronous.

A system described in "Multiple Signal Reproducing Device" (Unexamined Patent Publication Number Hei07-336325) shows an example of a demodulator, which switches time constants according to the reception state, synchronous/asynchronous, thereby achieving highly efficient demodulation.

According to this system, the demodulator is equipped with a loop filter. Different values of time constants are then provided to correspond to the two states of a synchronous state and an asynchronous state. Thus the time constants are switched according to the state.

The above-mentioned system, however, does not relate to a receiving device for receiving a phase-modulated burst signal used for radio communications. In addition to this, the system does not have the objective of improving receiver sensitivity in radio communications where a phase-modulated burst signal is demodulated by a synchronous detection system (or a quasi-synchronous detection system).

"Control Method for Radio Communication Device and Radio Communication Device" (Unexamined Patent Publication Number 2003-209485) is configured to have a plurality of time constants and filters each provided for each time constant, so that an optimum value of an filter output can be selected. This has the effect that an output value of a filter using an optimum time contestant is always selected.

Such an approach to have a filter circuit corresponding to each time constant, however, requires as many filters using time constants as the number of the time constants. This results in an increase in the size of a circuit.

The TDMA-TDD system in mobile communications requires highly accurate performance in frequency deviation compensation, carrier recovery, and bitclock recovery when a synchronous detection system (or a quasi-synchronous detection system) is employed as a demodulation system of a demodulation section in a receiving unit for receiving a phase-modulated burst signal. Functional blocks for frequency deviation compensation, carrier recovery, and bitclock recovery each require a loop filter for averaging, sequential computing, etc., so that sufficient performance cannot be expected if only one type of a time constant is multiplied in the loop filter.

With a demodulation section that is equipped with a loop filter circuit and performs synchronous detection (or quasi-synchronous detection) based on the TDMA-TDD system, when a burst signal has changed from asynchronous to synchronous, if the size of the time constant is unchanged or a rapid change is made in the size of the time constant from a small value for an asynchronous state to a large value for a synchronous state, then jitter after convergence cannot be minimized and quick pull-in cannot be achieved.

Patent Document 1: Unexamined Patent Publication No. Hei 7-336325
Patent Document 2: Unexamined Patent Publication No. 2003-209485

DISCLOSURE OF THE INVENTION

Problems to be Solved by the Invention

An object of the present invention is to minimize jitter caused by noise and achieve quick pull-in in a demodulation process for processing a phase-modulated burst signal by synchronous detection (or quasi-synchronous detection) in a TDMA-TDD system.

Means to Solve the Problems

A radio communication apparatus according to this invention may be characterized by including:
a demodulation section that may receive a phase-modulated burst signal, and demodulate the burst signal using one of a synchronous detection system and a quasi-synchronous detection system; and
a demodulation control section that may generate a control signal to control demodulation of the burst signal in the demodulation section based on a reception state of the burst signal at the demodulation section. The demodulation section may be characterized by including,
a filter that may filter a signal based on the burst signal using a set time constant, and
a time constant switching section that may switch a time constant of the filter based on the control signal.

The filter may be characterized by being a loop filter in a frequency deviation compensation section that may compensate deviation of a frequency of the burst signal.

The filter may be characterized by being a loop filer in a carrier recovery section that may recover a carrier wave of the burst signal.

The filter may be characterized by being a loop filer in a bit timing recovery section that may recover bit timing of the burst signal.

The filter may be characterized by being a loop filer in a reception level conversion section that may convert a reception level of the burst signal.

The demodulation section may be characterized by demodulating a digitally phase-modulated burst signal by a Time Division Multiple Access system.

The demodulation control section may be characterized by detecting the reception state of the burst signal at the demodulation section to determine one of three states, a synchronous state, an asynchronous state, and an intermediate state between the synchronous state and the asynchronous state, and outputting the control signal indicating a detected reception state. The switching section may be characterized by including a time constant having a large value for the synchronous state, a time constant having an intermediate value for the intermediate state, and a time constant having a small value for the asynchronous state, and switching the time constants according to the reception state indicated by the control signal.

The demodulation control section may be characterized by determining as the intermediate state a reception state of a predetermined number of frames or slots of the burst signal at the demodulation section in transition from the asynchronous state to the synchronous state.

The demodulation control section may be characterized by determining as the intermediate state a reception state of a predetermined number of frames or slots of the burst signal at the demodulation section in transition from the synchronous state to the asynchronous state.

The demodulation control section may be characterized by detecting the reception state of the burst signal at the demodulation section by a signal-to-noise ratio, and outputting the control signal indicating a detected reception state. The switching section may be characterized by switching the time constants according to the reception state indicated by the control signal.

A modulation method according to this invention is a modulation method that may be used in a radio communication apparatus including a demodulation section that may receive a burst signal and demodulate the signal by a synchronous detection system using a filter, and a demodulation control section that may control the demodulation section. The modulation method may be characterized by including:

the demodulation section:

receiving a digitally phase-modulated burst signal by a time division multiple access system;

the demodulation control section:

generating a control signal to control a time constant of the filter in the demodulation section based on a reception state of the burst signal at the demodulation section; and the demodulation section:

switching the time constant of the filter based on the control signal and filtering a signal based on the burst signal.

The demodulation method may be characterized by including:

the demodulation control section:

detecting the reception state of the burst signal at the demodulation section to determine one of three states, a synchronous state, an asynchronous state, and an intermediate state between the synchronous state and the asynchronous state;

outputting the control signal indicating a detected reception state, and the demodulation section:

switching time constants according to the reception state indicated by the control signal among a time constant having a large value for the synchronous state, a time constant having an intermediate value for the intermediate state, and a time constant having a small value for the asynchronous state.

The demodulation method may be characterized by including:

determining the reception state of the burst signal at the demodulation section as an intermediate state in transition from the asynchronous state to the synchronous state; and determining the reception state of the burst signal at the demodulation section as an intermediate state in transition from the synchronous state to the asynchronous state.

A frequency deviation compensation circuit according to this invention may be characterized by including:

a multiplier that may receive phase information and amplitude information of a burst signal, multiply the phase information by the amplitude information, and generate a complex signal;

a delayed detection circuit that may process by delayed detection the complex signal generated by the multiplier and obtain phase difference information;

an angle information extraction circuit that may extract angle information from the phase difference information obtained in the delayed detection circuit;

a subtractor that may subtract an amount of angle of frequency deviation from the angle information obtained in the angle information extraction circuit;

a modulated component removal circuit that may obtain a difference of the angle information subtracted in the subtractor from a point at an angle of 45 degrees from both an I-axis and a Q-axis on an IQ plane, and output an amount of angular deviation so that the difference in angle becomes an amount of variation from the I-axis;

a limiter circuit that may limit an excess amount of deviation when the amount of angular deviation from the modulated component removal circuit exceeds an acceptable amount of deviation;

a selector switch that may select one of a plurality of time constants;

a multiplier that may multiply the amount of angular deviation outputted from the limiter circuit by a selected time constant by the selector switch;

a first integrator that may add an amount of angular deviation multiplied by the time constant by the multiplier, and output a result as the amount of angle of frequency deviation;

a second integrator that may add the amount of angle of frequency deviation obtained at the first integrator, thereby restoring a phase difference obtained by the delayed detection circuit;

an angular information-complex information conversion circuit that may convert angle information obtained at the second integrator to a complex signal; and a frequency deviation compensator that may multiply complex data obtained at the multiplier by the complex signal of the angle information obtained at the angle information-complex information conversion circuit so as to eliminate deviation of a phase angle.

BEST PERIOD FOR CARRYING OUT THE INVENTION

Embodiment 1

In this embodiment, a description is given with reference to a TDMA-TDD system such as PHS (registered trademark, a handy phone system) as an example. Specifically, an explanation is given of a demodulation section of a synchronous detection system (or a quasi-synchronous detection system), which requires highly efficient frequency deviation compensation, carrier recovery, and bitclock recovery. More specifically, a case of receiving a phase-modulated burst signal is explained.

In this embodiment, a description is given of a case where three or more stages of time constants, such as two stages in an asynchronous state and one stage in a synchronous state, or one stage in an asynchronous state and two stages in a synchronous state, for example, are used for a loop filter equipped in a frequency deviation compensation section or a carrier recovery section of a demodulation section, instead of using a fixed time constant or two stages of time constants used at a pull-in stage (an asynchronous period) and a stationary stage (a synchronous period). Such application of time constants in three or more stages may serve to achieve quick pull-in and minimize jitter after convergence, and also achieve highly efficient frequency deviation compensation, etc. required for synchronous detection (or quasi-synchronous detection) without increasing circuit size.

According to this embodiment, an intermediate value is provided in an optimum position in addition to large and small values of time constants to be multiplied in a loop filter, which makes it possible to achieve quick pull-in and minimize jitter. This allows steady performance in synchronous detection (or quasi-synchronous detection) of a phase-modulated burst signal, which may maximize the performance of synchronous detection (or quasi-synchronization detection).

A demodulation section of this embodiment discussed below is provided with a plurality of time constants of a loop filter.

The time constant is defined as the product of resistance R and capacitor C for a primary filter (an RC filter), for example. With a small time constant, there will be no filtering effect. With a large time constant, quick response cannot be performed to an input. Properly setting a time constant of a filter in compliance with a signal characteristic and the noise level of the signal may serve to suppress the influence of input noise.

A discussion will be given below of a case using the following three types of time constants:
1. a time constant having a small value for an asynchronous state;
2. a time constant having a large value for a synchronous state; and
3. a time constant having a value of an intermediate size.

The time constant having a value of an intermediate size is a time constant to be used for a loop filter at an initial stage of a synchronous state. The time constant having a value of an intermediate size is a time constant having a value of an intermediate size (an intermediate value of a time constant) between a small value for an asynchronous state and a large value for a synchronous state. The time constant having a value of an intermediate size is used for a loop filter at an initial stage of a synchronous state, which makes it possible to minimize jitter caused by noise and achieve quick pull-in. Jitter is time-related noise included in a digital waveform. Increased jitter may cause bits to fall out of synchronization and full-bit digital noise to occur.

The demodulation section of this embodiment discussed below is configured to operate as follows. The time constant having a value of an intermediate size is used for the first several frames (slots) in an initial stage of a synchronous state. Then, after processing the several frames (slots) by the time constant having a value of an intermediate size, the time constant is switched to the time constant having a large value for a synchronous state automatically by time.

Now, an explanation is given of a radio communication system in which the radio communication apparatus and the demodulation section of this embodiment discussed below operate.

A multiple access technology is one of technologies for efficiently multiplexing radio signals transmitted from a plurality of mobile terminals at multiple points for communication. The following three systems are examples of the multiple access technology that are used in an UP channel from a mobile terminal to a mobile communication base station:

(1) Frequency Division Multiple Access (FDMA):

It is a system that divides an electric wave by frequency, allocates divided frequencies to individual users, and multiplexes them for transmission.

(2) Time Division Multiple Access (TDMA):

It is a system that divides an electronic wave by time, allocates divided time (time slots) to individual users, and multiplexes them.

(3) Code Division Multiple Access (CDMA):

It is a system that performs spreading by spread codes (Pseudo Noise: PN) allocated to individual users, and multiplexes them for transmission.

The Time Division Multiple Access system is applied to the radio communication apparatus of this embodiment.

The following Duplex technologies are examples of a method to implement UP and Down links in an interactive communication between a mobile terminal and a mobile radio base station.

(1) Frequency Division Duplex (FDD):

It is a system that separates UP and Down links by frequency.

(2) Time Division Duplex (TDD):

It is a system that separates UP and Down links by time.

The Time Division Duplex system is applied to the radio communication apparatus of this embodiment.

A modulation/demodulation system includes amplitude modulation, frequency modulation, and phase modulation. The demodulation section of the radio communication apparatus of this embodiment demodulates a phase-modulated signal. Phase Modulation is to cause the phase of a carrier to vary, and allocate 0 or 1 to each different phase, thereby transferring bit data, for example. The demodulation section of the radio communication apparatus of this embodiment demodulates a signal of a Digital Phase Modulation system, or a Phase Shift Keying (PSK) Modulation system.

Demodulation, also called detection, is a process of extracting a signal wave from a modulated wave. This demodulation system (detection system) includes synchronous detection, quasi-synchronous detection, delayed detection, and frequency detection. Synchronous detection (Synchronized Detection) is a form of detection system in which the phase of a modulated signal is compared with that of a standard signal, and a modulating signal is extracted. Quasi-synchronous detection is a form of detection system that demodulates a quadrature-modulated wave using a local signal of a fixed frequency, recovers a digital carrier, thereby performing phase rotation, and extracts a modulating signal.

The synchronous detection or the quasi-synchronous detection is used for demodulation in the demodulating section of the radio communication apparatus of this embodiment.

Progressive Transmission and Burst Transmission are available forms of transmitting a data signal by a radio communication apparatus. Burst Transmission is a transmission system in which data signals are transmitted at intermittent periods. A burst signal is a data signal transmitted by Burst Transmission.

The demodulation section of the radio communication apparatus of this embodiment receives and demodulates a burst signal by Burst Transmission.

To sum up the discussion so far, the radio communication apparatus and the demodulation section of this embodiment receives a TDMA-TDD based PSK-modulated burst signal, and demodulates the signal by the synchronous detection system or the quasi-synchronous detection system. Accordingly, highly efficient performance is requested in frequency deviation compensation, carrier recovery, and bitclock recovery.

An embodiment of the present invention will be explained below with reference to figures.

FIG. 1 is a conceptual block diagram of a demodulation section of this embodiment.

FIG. 2 is a diagram illustrating a burst signal.

Referring to FIG. 1, an antenna element 11 is an antenna element that receives a radio wave signal of a TDMA based burst signal. As shown in FIG. 2, a burst signal is received on a frame basis at intermittent periods. Each frame has a unique word (UW) added as a reference signal. The data pattern of a unique word (UW) is known and the absolute phase thereof can be detected. Therefore, detection of this data pattern may serve to determine whether it is synchronous or asynchronous.

An Analog/Digital (A/D) conversion section 12 is a conversion section that converts an analog signal to a digital signal.

A demodulation section 13 is a demodulation section that demodulates a TDMA based burst signal by digital base band signal processing.

A loop filter 14 is a filter that performs averaging in the demodulation section 13. The loop filter 14, which will be elaborated later with reference to FIG. 3, is equipped in each of a frequency deviation compensation circuit, a bit timing recovery circuit, a reception level conversion circuit, and a carrier recovery circuit, which are elements of the demodulation section 13.

A selector switch 15 is a switch that receives a control signal indicating synchronous or asynchronous from a demodulation control section 16, and selects an optimum time constant. For example, the time constant has large and intermediate values for a synchronous state and a small value for an asynchronous state. The values of time constants may be stored in a table of a Read Only Memory (ROM), etc. in a large-scale integrated circuit, for example. The selector switch 15 is an example of a time constant switching section. The time constant switching section may be a selector switch that physically switches resistance R, or anything that reads a time constant stored in a table of a ROM in a large-scale integrated circuit etc. and sets the time constant. They may be implemented by hardware, software, firmware, or a combination thereof.

The demodulation control section 16 is a control section that determines the reception state of a burst signal, whether it is synchronous or asynchronous, based on the unique word (UW) of demodulated data, and transmits a control signal to the demodulation section.

Elements of the demodulation section 13 and those of the demodulation control section 16 may be implemented by hardware, software, firmware, or a combination thereof. For example, each function may be implemented by executing a program by a CPU. A program is stored in a memory or a storage medium not shown, then retrieved and executed by a CPU. In a hardware implementation, each section may be implemented by an analog circuit or a digital circuit.

Next, a description will be given of actions and effects.

In FIG. 1, an analog signal received at the antenna element 11 is processed in the A/D conversion section 12 to become a digital signal of phase information and amplitude information.

In the demodulation section 13, an input digital signal is demodulated when the value of a time constant used for the loop filter 14 equipped in the demodulation section is selected by the selector switch 15 from among at least two or more values of a plurality of values based on the control signal from the demodulation control section 16.

Another possible time constant switching control is to count the number of frames (slots) of received data, and switch time constants when the count reaches a specific number.

It is also possible to switch time constants based on the combination of the control signal and the number of frames (slots).

The demodulation control section 16 receives demodulated data by the demodulation section 13, identifies channel information on a control channel, a communication channel, etc. and a synchronous/asynchronous state, and transmits to the demodulation section 13 a control signal indicating which time constant to use for a loop filter of those having a large value and a small value.

When a quick transition is desired from an asynchronous state to a synchronous state, then a control signal to control the selector switch 15 to select the time constant having a small value is transmitted to the demodulation section 13.

To achieve a quick transition from an asynchronous state to a synchronous state, and also minimize jitter after pull-in of a loop filter, the following operation is performed.

First, the demodulation control section 16 sends to the demodulation section 13 a control signal to control the selector switch 15 to select a time constant having a small value.

The demodulation control section 16, when confirmed a state transition to a synchronous state, then sends to the demodulation section 13 a control signal to control the selector switch 15 to select a time constant having a large value.

In fact, the control signal controls automatic switching so that a time constant having an intermediate value is selected during a period of the first several frames (slots), and then the time constant having a large value is selected.

Switching time constants in this manner makes it possible to achieve quicker convergence of a loop filter than not using the time constant having an intermediate value. Additionally, jitter caused by noise after convergence may be minimized.

If synchronization is nearly lost by a sudden increase in carrier frequency deviation or bitclock deviation, such automatic switching control may also be available that the time constant having an intermediate value is switched from the time constant having a large value for a synchronous state, and then after several frames (slots), switched back to the time constant having a large value in the selector switch 15.

This serves to achieve quick convergence to a new convergence value of a loop filter, thereby reducing loss of synchronization to occur.

As discussed earlier, the use of the time constant having a small value allows quick pull-in of a loop filter, thereby achieving quick transition to a synchronous state. The use of the time constant having a large value allows jitter at a convergence value after pull-in of a loop filter to be minimized.

When the time constant is switched over to a large value just after transition to a synchronous state, the time constant becomes the large value when the state has not actually become fully synchronous yet from the asynchronous state. Therefore, it takes a lot of time to pull in, and also minimize jitter.

Reduction in the pull-in time needs to use the time constant having a smaller value, which makes it difficult to minimize jitter.

When the demodulation section employs a synchronous detection system (or a quasi-synchronous detection system) based on the TDMA-TDD system, such as PHS (registered trademark), short-term convergence is required and jitter should be minimized as much as possible. Therefore, optimum performance of synchronous detection (or quasi-synchronous detection) may be achieved by two-stage switching of time constants rather than by a fixed time constant. The use of three or more stage switching of time constants is even more effective.

FIG. 3 shows a configuration of the demodulation section 13 of the TDMA-TDD system. The demodulation section 13 includes a plurality of functional blocks each equipped with a loop filter.

The reception level conversion section 21 is a conversion section that normalizes amplitude information so that amplitude fluctuates within a defined area, thereby converting the level of a received signal.

A loop filter 22 is a filter that is used for averaging a reception level in the reception level conversion section 21.

A selector switch 23 is a switch that is capable of switching time constants to be used for the loop filter 22. The selector switch 23 has a mechanism that selects one of a plurality of time constants in a table based on a control signal from the demodulation control section 16, for example. Alternatively, the selector switch 23 may count the number of received frames (slots), and then switch time constants between different values automatically when the count reaches a specific number of frames (slots).

A frequency deviation compensation section 24 is an automatic frequency control (AFC) circuit to compensate frequency deviation.

A loop filter 25 is a filter to be used for integrating the amount of phase rotation in the automatic frequency control circuit.

A selector switch 26 is a switch that is capable of switching time constants to be used for the loop filter 25.

The selector switch 26 has a mechanism that selects one of a plurality of time constants in a table based on a control signal from the demodulation control section 16, for example. Alternatively, the selector switch 26 counts the number of received frames (slots), and then switch time constants between different values automatically when the count reaches a specific number of frames (slots).

A bit timing recovery section 27 is a circuit to recover bit timing in transmission data.

A loop filter 28 is a filter used in correlation value calculation between a phase rotation factor and an amount of phase variation in the bit timing recovery section 27.

A selector switch 29 is a switch capable of switching time constants to be used for the loop filter 28. The selector switch 29 has a mechanism that selects one of a plurality of time constants in a table based on a control signal from the demodulation control section 16, for example. Alternatively, the selector switch 29 may count the number of received frames (slots), and then switch time constants between different values automatically when the count reaches a specific number of frames (slots).

A carrier recovery circuit 210 is a circuit to recover a carrier wave.

A loop filter 211 is a filter that is used in channel estimation by LMS algorithm in the carrier recovery circuit 210.

A selector switch 212 is a switch capable of switching time constants to be used for the loop filter 211. The selector switch 212 has a mechanism that selects one of a plurality of time constants in a table based on a control signal from the demodulation control section 16, for example. Alternatively, the selector switch 212 may count the number of received frames (slots), and then switch time constants between different values automatically when the count reaches a specific number of frames (slots).

The demodulation control section 16 is a control section that receives demodulated data from the carrier recovery circuit, determines a synchronous/asynchronous state and a channel type, and transmits a control signal to the filter 22, 25, 28, 211 to instruct to switch time constants. The demodulation control section 16 in a system such as PHS (registered trademark), for example, determines whether it is synchronous or asynchronous based on unique word detection or unique word pulse passing through an aperture gate, etc.

A description is now given of actions and effects.

In FIG. 3, the reception level conversion section 21, upon receipt of amplitude information, averages the amplitude information by the loop filter 22.

With an asynchronous state, in order to achieve quick pull-in and quick transition to a synchronous state, a control signal is sent from the demodulation control section 16 to make the selector switch 23 select a small value of the time constant to be multiplied.

After transition to a synchronous state, where it is desired to make pull-in a little slower than in the asynchronous state and jitter after pull-in lower to some extent, a control signal is sent from the demodulation control section 16 to make the selector switch 23 to select an intermediate value of the time constant to be multiplied in the loop filter 22.

Subsequently, the selector switch 23, upon receipt of several frames (slots), switches time constants so as to select a large value from the intermediate value in order to further minimize jitter.

This may serve to achieve quick pull-in of a reception level averaging procedure and minimize jitter after convergence of averaged reception level after pull-in. Accordingly, steady performance of reception level normalization may be achieved.

Alternatively, the time constant may be switched from the intermediate value to the large value based on a control signal from the demodulation control section 16.

The frequency deviation compensation section 24, upon receipt of amplitude information and phase information, obtains the amount of frequency deviation and averages it by the loop filter 25.

With an asynchronous state, where it is desired to achieve quick transition to a synchronous state, a control signal is sent from the demodulation control section 16 to make the selector switch 26 select a small value of the time constant to be multiplied in the loop filter 25.

After transition to a synchronous state, where it is desired to make pull-in a little slower than in the asynchronous state and jitter after pull-in lower to some extent, a control signal is sent from the demodulation control section 16 to make the selector switch 26 select an intermediate value of the time constant to be multiplied in the loop filter 25.

Subsequently, the selector switch 26, upon receipt of several frames (slots), switches time constants so as to select a large value from the intermediate value in order to further minimize jitter.

This may serve to achieve quick pull-in of a frequency deviation amount averaging procedure and minimize jitter after convergence of averaged amount of frequency deviation after pull-in. Accordingly, a quick and efficient performance may be achieved in frequency deviation compensation.

Alternatively, the time constant may be switched from the intermediate value to the large value based on a control signal from the demodulation control section 16.

The bit timing recovery section 27, upon receipt of phase information, obtains a correlation between the phase information and a free-running clock by the loop filter.

With an asynchronous state, where it is desired to achieve quick transition to a synchronous state, a control signal is sent from the demodulation control section 16 to make the selector switch 29 select a small value of the time constant to be multiplied in the loop filter 28.

After transition to a synchronous state, where it is desired to make pull-in a little slower than in the asynchronous state and jitter after pull-in lower to some extent, a control signal is sent from the demodulation control section 16 to make the selector switch 29 select an intermediate value of the time constant to be multiplied in the loop filter 28.

Subsequently, the selector switch 29, upon receipt of several frames (slots), switches time constants so as to select a large value from the intermediate value in order to further minimize jitter.

This may serve to achieve quick pull-in of correlation value calculation for recovery of bitclock (symbol clock of π/4 shift QPSK) and minimize jitter after convergence of an averaged frequency deviation amount after pull-in. Accordingly, a quick and efficient performance may be achieved of bitclock recovery.

Alternatively, the time constant may be switched from the intermediate value to the large value based on a control signal from the demodulation control section 16.

The carrier recovery section 210, upon receipt of frequency deviation compensated I, Q data and recovered clock, carries out a process of carrier recovery using the loop filter 211.

A method of sequential computation using costas loop or Least Mean Square (LMS) Algorithm for channel estimation is known to be applicable to the carrier recovery section 210. To a time constant to be multiplied in a loop filter used for any of them, a small value is selected by the selector switch 212 based on a control signal sent from the demodulation control section 16 in an asynchronous state, where it is desired to achieve quick transition to a synchronous state.

After transition to a synchronous state, where it is desired to make pull-in a little slower than in the asynchronous state and jitter after pull-in lower to some extent, a control signal is sent from the demodulation control section 16 to make the selector switch 212 select an intermediate value of the time constant to be multiplied in the loop filter 211.

Subsequently, the selector switch 212, upon receipt of several frames (slots), switches time constants so as to select a large value from the intermediate value in order to further minimize jitter. This may serve to achieve quick convergence of a transmission line estimation value and minimize jitter after pull-in. Accordingly, a quick and efficient performance may be achieved.

Alternatively, the time constant may be switched from the intermediate value to the large value based on a control signal from the demodulation control section 16.

FIG. 4 shows a configuration of the frequency deviation compensation section 24 (an automatic frequency control circuit or a frequency deviation compensation circuit) having a loop filter that uses a plurality of time constants.

A multiplier 41 is a multiplier that multiplies input phase information by input amplitude information, and generates a complex signal.

A delayed detection circuit 42 is a delayed detection circuit that obtains a phase difference by a delayed detection system.

An angle information extraction circuit 43 is a circuit that extracts angle information from a complex value including phase difference information obtained by the delayed detection circuit 42.

A subtractor 44 is a subtractor that subtracts in the loop filter an obtained amount of angle of frequency deviation from the angle information.

A modulated component removal circuit 45 is a circuit that obtains a difference between the angle information extracted in the angle information extraction circuit 43 and a point at an angle of 45 degrees from both of an I axis and a Q axis on an IQ plane so as to make the angle difference equal to the amount of variation from the I axis.

A limiter circuit 46 is a circuit that is capable of ignoring any excess over an amount of deviation accepted by the system as a portion caused by noise.

A multiplier 47 is a multiplier that selects one of a plurality of time constants, and multiplies a selected one.

An integrator 48 is an integrator that adds an amount of angular deviation to produce an amount of angle of frequency deviation.

An integrator 49 is an integrator that restores the phase difference obtained by the delayed detection circuit 42 by adding the amount of angle of frequency deviation.

An angle information-complex information conversion circuit 410 is a circuit that converts angle information obtained by the integrator 49 to a complex signal.

A frequency deviation compensator 411 is a compensator that multiplies complex data obtained by the multiplier 41 by the complex signal of the angle information obtained by the angle information-complex information conversion circuit 410 so as to eliminate a portion of deviation of a phase angle.

A description will now be given of actions and effects.

Referring to FIG. 4, the phase information and the amplitude information are processed by complex multiplication in the multiplier 41. In the delayed detection circuit 42, a product is then multiplied by a complex conjugate of data of the previous symbol, thereby thus obtaining a phase difference by complex multiplication.

A complex signal including the phase difference information obtained by the delayed detection circuit 42 is processed in the angle information extraction circuit 43 so that only angle information is extracted.

In the modulated component removal circuit 45, a difference between the angle information extracted in the angle information extraction circuit 43 and a point in a quadrant, where the angle information exists, from among points at an angle of 45 degrees from the I axis and the Q axis on the IQ plane is obtained, and makes the difference as the amount of variation from the I axis.

The limiter circuit 46 limits the amount of angular variation obtained in the modulated component removal circuit 45 so as not to go over an amount of frequency deviation prescribed by communications standards.

The multiplier 47 multiplies the amount of angular variation limited by the limiter circuit 46 by a time constant.

With an asynchronous state, in order to achieve quick pull-in, a control signal to select a small value of the time constant is sent from the demodulation control section, and the small value of the time constant is thus multiplied.

After transition to a synchronous state, a control signal indicating a synchronous state is sent from the demodulation control section so that an intermediate value of the time constant is selected and multiplied in the multiplier 47. Consequently, pull-in speed becomes slower but jitter after convergence is minimized.

After a period of several frames (slots), the time constant is switched to a large value, and jitter after convergence is further minimized.

The integrator 48 adds the amount of angular variation obtained by multiplying the time constant in the multiplier 47, and obtains an average value of the amount of angular variation.

The subtractor 44 subtracts an integral product of the amount of angular variation obtained by the integrator 48 from data outputted from the angle information extraction circuit 43. Thus, only a difference between the angle information extracted in the angle information extraction circuit 43 and the average value of the amount of angular variation is sent to the loop filter. This allows a gradual convergence of the amount of angular variation to an amount of existing variation in the loop filter.

In the integrator 49, the amount of angular variation integrated in the integrator 48 is added, and then the phase rotation obtained in the delayed detection circuit 42 is added.

The amount of angular variation added with the phase rotation in the integrator 49 is converted to complex data in the angle information-complex information conversion circuit 410. The complex conjugate of the angle information converted to the complex data in the angle information-complex information conversion circuit 410 is multiplied in the frequency deviation compensator 411 by complex data outputted from the multiplier 41. This removes the amount of angular variation of the data outputted from the multiplier 41.

The gradual change in the value of a time constant from a small value to an intermediate value, and then to a large value allows the amount of angular variation to be integrated in the integrator 48 to achieve quick convergence and obtain a small value of jitter.

FIG. 5 is a state transition diagram illustrating synchronous and asynchronous states that are determined by the demodulation control section and corresponding sizes of time constants that the loop filters in the demodulation section are required to use.

A State 51 is an asynchronous state, a State 52 is a synchronous state 1 (an intermediate state), and a State 53 is a synchronous state 2.

There is one type of asynchronous state (State 51). There are two types of synchronous states:
the synchronous state 1 (State 52) for a period of the first several frames (slots) after transition to a synchronous state; and
the synchronous state 2 (State 53) for a period after the first several frames (slots) after transition to the synchronous state.

An intermediate value is used of the time constant in the synchronous state 1, and therefore pull-in speed is faster than that of the time constant having a large value. Thus, there is a low probability of transition from the synchronous state 1 (State 52) to the asynchronous state (State 51).

FIG. 6 is a state transition diagram illustrating synchronous and asynchronous states that are determined by the demodulation control section and corresponding sizes of time constants that the loop filters in the demodulation section are required to use.

A State 61 is an asynchronous state, a State 52 is a synchronous state 1 (an intermediate state), a State 63 is a Synchronous State 2, and a State 64 is a synchronous state 3 (an intermediate state).

There is one type of asynchronous state (State 61). There are three types of synchronous states:
the synchronous state 1 (State 62) for a period of the first several frames (slots) after transition to a synchronous state;
the synchronous state 2 (State 63) for a period after the first several frames (slots) after transition to the synchronous state; and
the synchronous state 3 (State 64) for a period of the synchronous state when a transition is about to be made to an asynchronous state.

An intermediate value is used of the time constant in the synchronous state 1, and therefore pull-in speed is faster than that of the time constant having a large value. Thus, there is a low probability of transition from the synchronous state 1 (State 52) to the asynchronous state (State 51).

An intermediate value is used of the time constant in the synchronous state 3 (State 64), and therefore pull-in speed is faster than that of the time constant having a large value. In case of a sudden change in the frequency deviation or reception level, pull-in may be restarted more quickly than that of the time constant having a large value. Thus, there is a low probability of transition from the synchronous state 3 (State 64) to the asynchronous state (State 61).

FIG. 7 is a state transition diagram illustrating synchronous and asynchronous states that are determined by the demodulation control section and corresponding sizes of time constants that the loop filters in the demodulation section are requested to use.

A State 71 is an asynchronous state 1, a State 72 is an asynchronous state 2 (an intermediate state), a State 73 is a synchronous state, and a State 74 is an asynchronous state 3 (an intermediate state).

Asynchronous states includes:
the asynchronous state 1 (State 71) for a period of the first several frames (slots) after beginning to receive frames (slots) that are to be received in an asynchronous state;
the asynchronous state 2 (State 72) for a period after the first several frames (slots) (e.g. control channels of a PHS system); and
the asynchronous state 3 (State 74) of an asynchronous state only after the first several frames (slots) from a loss of synchronization.

There is one type of synchronous state (State 73).

In the asynchronous state 2 (State 72), if a transition is not made to a synchronous state (State 73) after several frames (slots), then a transition is made to the asynchronous state 1 (State 71).

A transition from an asynchronous state to a synchronous state is made after a transition from the asynchronous state 1 (State 71) with the time constant having a small value to the asynchronous state 2 (State 72) with the time constant having an intermediate value. With a strict threshold given to determine a synchronous state, therefore, there is the effect of having a transition to a synchronous state more easily than the case of having only one type of asynchronous state since jitter after pull-in may be made lower than that of the time constant having a small value.

When a transition is made from a synchronous state to an asynchronous state, the asynchronous state 3 (State 74), which requests a time constant having an intermediate value, is applied for the first several frames (slots). The use of the time constant having an intermediate value may serve to make jitter after pull-in lower than that of the time constant having a small value. Therefore, there is an effect of quick transition to the synchronous state (State 73) again.

FIG. 8 shows an example of the configuration of the demodulation control section 16.

A UW detection section 101 detects the pulse of a unique word (UW) and determines whether it is synchronous or asynchronous. A frame number counter 102 is a counter that counts the number of frames (or slots) that are detected synchronous by the UW detection section 101. A control signal generation section 103 generates a control signal based on a count of the frame number counter 102.

The frame number counter 102 may alternatively count the number of slots instead of frames. It is also possible to count frame time instead of the frame number. It is still possible to count slot time instead of the slot number. Still alternatively, a predetermined time may be counted instead. The frame number counter 102 may even count the number of destroyed frames (slots).

A frame (slot) format includes a unique word (UW) for identifying a synchronous state and timing. In the demodulation control section, it is determined whether or not a UW pulse is detected in the UW detection section 101. When a UW pulse is not detected, then a corresponding frame (slot) is destroyed. When a UW pulse is detected, then the number of frames (slots) is counted in the frame number counter 102. In the control signal generation section 103, a control signal identifying the size of the time constant to be selected is generated and sent to each functional block having a loop filter in the demodulation section.

In replacement of the UW detection section 101, a signal-to-noise ratio determination section may be provided to determine a synchronous/asynchronous state by C/N (signal-to-noise ratio).

FIG. 9 is a flow chart illustrating a practical example of the demodulation control section 16 determining a state transition from the asynchronous state to the synchronous state 1, and then to the synchronous state 2 in FIG. 5 and FIG. 6.

A step 81 is a conditional branch based on unique-word (UW) detection.

A step 82 is a conditional branch if it is before or after the lapse of two frames.

With reference to the asynchronous state (State 51, State 61) of FIG. 5 and FIG. 6, a transition is made to the asynchronous state (State 51, State 61) when the UW detection section 101 detects no UW in the step 81. When the UW detection section 101 detects a UW in the step 81, then the frame number counter 102 counts the number of frames. In the step 82, the lapse of two frames are judged. If it is before the lapse of two frames, then a transition is made to the synchronous state 1 (State 52, State 62). If it is after the lapse of two frames, then a transition is made to the synchronous state 2 (State 53, State 63).

FIG. 10 is a flow chart illustrating a practical example of the demodulation control section 16 determining state transitions from the synchronous state to the asynchronous state 3, from the asynchronous state 3 to the asynchronous state 1, and from the asynchronous state 3 to the synchronous state in FIG. 7.

A step 91 is a conditional branch if a unique word (UW) is not detected.

A step 92 is a conditional branch if a unique word (UW) was detected two frames (slots) ago.

With reference to the synchronous state (State 73) of FIG. 7, a transition is made to the synchronous state (State 73) when the UW detection section 101 detects a UW in the step 91. When the UW detection section 101 stops detecting a UW in the step 91, then the frame number counter 102 counts the number of frames. In the step 92, it is determined whether or not a UW was detected two frames ago. When a UW was detected, then a transition is made to the asynchronous state 3 (State 74). When a UW was not detected, then a transition is made to the asynchronous state 1 (State 71).

FIG. 11 shows how pull-in of a loop filter using three types of time constants is made according to this embodiment.

FIG. 12 shows how pull-in of a loop filter using two types of time constants is made according to this embodiment.

Referring to FIG. 11 and FIG. 12, a horizontal axis denotes time. The horizontal axis denotes slot time. The horizontal axis may alternatively denote frame time. A vertical axis denotes how phase deviation, frequency deviation, etc. converge.

FIG. 11 shows a three-stage transition, small→intermediate→large, of the time constants. Pull-in is made using the time constant having an intermediate value during a synchronous period of the first and second slots. Pull-in is started using the time constant having a large value from the third slot. The convergence value is thus reached at a convergence time A. Jitter is low after convergence.

FIG. 12 shows a two-stage transition, small→large, of time constants. Pull-in is started using the time constant having a large value from the first slot of synchronization. The convergence value is thus reached at a convergence time B. Jitter is high after convergence.

The use of the time constant having an intermediate value of FIG. 11, convergence time A<the convergence time B, gets near to the convergence value quicker. In addition to this, jitter after convergence may be minimized.

As discussed earlier, the radio communication apparatus of this embodiment may be characterized by being equipped with the demodulation section 13 that receives a phase-modulated burst signal and demodulates the burst signal by the synchronous detection system or the quasi-synchronous detection system, and the demodulation control section 16 that generates the control signal for controlling the demodulation of the burst signal performed in the demodulation section based on the reception state of the burst signal in the demodulation section 13. The demodulation section 13 may also be characterized by demodulating the digitally phase-modulated burst signal using the Time Division Multiple Access system. The demodulation section 13 may also be characterized by having the loop filter 14 that filters a signal based on the burst signal and the time constant switching section 15 that switches the time constants of the loop filter based on the control signal.

The signal based on the burst signal may be defined as any of amplitude information, phase information, and angle information of a burst signal, recovery clock, a frequency-devastation compensated signal of I, Q data, etc.

Further, the loop filter may be characterized by being defined as the loop filter used in any of the frequency deviation compensation section 24 that compensates the deviation of the frequency of a burst signal, the carrier recovery section 210 that recovers the carrier wave of a burst signal, the bit timing recovery section 27 that recovers the bit timing of a burst signal, and the reception level conversion section 21 that converts the reception level of a burst signal.

Further, the demodulation control section 16 may be characterized by detecting the reception state of a burst signal from among the three types of states, the synchronous state, the asynchronous state, and the intermediate state between the synchronous state and the asynchronous state, and outputting a control signal indicating a detected reception state. The time constant switching section 15 may be characterized by including the time constant having the large value for the synchronous state, the time constant having the intermediate value for the intermediate state, and the time constant having the small value for the asynchronous state, and switching the time constants corresponding to the three types of reception states based on the control signal.

The demodulation control section 16 may be characterized by using the intermediate state for the reception state of the predetermined number of frames when the reception state of a burst signal in the demodulation section 13 changes from the asynchronous state to the synchronous state.

The demodulation control section 16 may also be characterized by using the intermediate state for the reception state of the predetermined number of frames when the reception state of a burst signal in the demodulation section 13 changes from the synchronous state to the asynchronous state.

Further, the demodulation control section may be characterized by detecting the reception state of a burst signal in the demodulation section by the signal-to-noise ratio, and outputting the control signal indicating a detected reception state. The time constant switching section 15 may be characterized by switching time constants in accordance with a reception state indicated by the control signal.

The demodulation control system of this embodiment may be characterized by controlling the size of the time constant to be used for the loop filter so that the small value is used in an asynchronous state, the large value is used in a synchronous state except for the period of the first several frames (slots), and the intermediate value is used during the period of the first several frames (slots).

Further, the demodulation control system of this embodiment may be characterized by controlling the size of the time constant to be used for the loop filter so that the small value is used in an asynchronous state, the large value is used in a synchronous state except for the period of the first several frames (slots), the intermediate value is used during the period of the first several frames (slots), and the intermediate value is also used for an asynchronous state only when it was synchronous several frames (slots) ago.

Further, the demodulation control system of this embodiment may be characterized by controlling the size of the time constant to be used for the loop filter so that the small value is used during the period of the first several frames (slots) after pull-in is started in an asynchronous state, the intermediate value is used after the first several frames (slots), the large value is used in the synchronous state, and the intermediate value is also used in an asynchronous state only when it was synchronous several frames (slots) ago.

Further, the demodulation control system of this embodiment may be characterized by controlling the size of the time constant that is switched automatically with the lapse of frame (slot) time, and in that the frame (slot) time is a period of two frames (slots).

Further, the demodulation control system of this embodiment may be characterized by controlling the size of the time constant that is switched automatically with the lapse of frame (slot) time, and in that the demodulation control section 16 is provided with the counter circuit for counting the number of frames (slots) and generates a control signal for selecting the time constant, upon receipt of a count result from the counter circuit.

Further, the demodulation control system of this embodiment may be characterized in that the frame or slot format is a TDMA-TDD based format. In other words, the demodulation control system of this embodiment may be characterized in that the frame or slot format is neither a CDMA-TDD based format nor a TDMA-TDD based format.

Further, the demodulation control system of this embodiment may be characterized in that frame synchronization is used for determining whether it is synchronous or asynchronous.

Further, the demodulation control system of this embodiment may be characterized in that the size of the time constant is changed by the three or more stage switching from the large value to the small value.

Further, the demodulation control system of this embodiment may be characterized in that C/N (signal-to-noise ratio) is used as the criterion to select the size of the time constant.

Further, the demodulation control system of this embodiment may be characterized in that the reception level conversion section 21, the frequency deviation compensation section 24 (the automatic frequency deviation control circuit), the bit timing recovery section 27, and the carrier recovery section 210 may select the size of the time constant to be multiplied in the loop filter from among the three different sizes.

It is also possible that the size of the time constant to be used for the loop filter is controlled not by three sizes but two sizes, large and small, of time constants such that the small value is used in an asynchronous state and the large value is used in a synchronous state, according to the demodulation control system of this embodiment. Alternatively, three stage switching, i.e. large+small, large, and small, may be performed with two sizes, large and small, of time constants. Another possibility is: large+small, large, large−small, and small.

The demodulation control system of the radio communication apparatus is applicable to a radio apparatus that is a receiver for receiving a phase-modulated burst signal and equipped with a modulation section of the synchronous or quasi-synchronous detection system. Time constants to be used for the loop filter for averaging in the frequency deviation compensation section are made switchable in accordance with the reception state, a synchronous state, an asynchronous state, etc. This may achieve a quick convergence of averaging and minimize jitter, and thus enables a stable operation of carrier recovery in synchronous detection (or asynchronous detection).

Further, not only for the loop filter of the frequency deviation compensation section but also for those of the reception level conversion section, the carrier recovery section, the bit timing recovery section, or for arbitrary or all loop filters in the demodulation section, the values of different sizes of the time constants are provided so that they can be switched. This may achieve a quick convergence of averaging and minimize jitter, thereby allowing a stable operation of demodulation.

Further, there is an effect of a unifying operation of demodulation in the demodulation section 13 because arbitrary or all loop filters in the demodulation section are instructed to perform this switching by the same control signal from the demodulation control section 16. Alternatively, the control signal may be outputted to each section individually. In this case, however, demodulation performed by the demodulation section 13 is controlled in accordance with the state of each section because the control signal is outputted under control of the demodulation control section 16.

Now, an explanation is given of the characteristic of the demodulation system of this embodiment with reference to differences from the system described in "Multiplex Signal Reproducing Device" (Unexamined Patent Publication No. HEI 7-336325).

The system disclosed in Unexamined Patent Publication No. HEI 7-336325 is not directed to mobile communications whereas the demodulation system of this embodiment is directed to mobile communications. The technical fields are therefore different.

The system described in Unexamined Patent Publication No. HEI 7-336325 is a frequency modulation system whereas the demodulation system of this embodiment is the demodulation of the PSK modulation (digital phase modulation) system. Therefore, the systems of the demodulation sections are different. Accordingly, the configurations of the demodulation sections are different. The system described in Unexamined Patent Publication No. HEI 7-336325 cannot be configured the same as the demodulation system shown in FIG. 3, FIG. 4, and FIG. 10 of this embodiment. For example, the system described in Unexamined Patent Publication No. HEI 7-336325 does not have the frequency deviation compensation section 24 for improving the efficiency of carrier recovery. Frequency deviation is specific to mobile communications. The demodulation system of this embodiment is directed to improving the efficiency of compensation of frequency deviation that is specific to mobile communications. It is important for the synchronous detection system for carrier recovery to improve the efficiency of the compensation of frequency deviation.

The system described in the Unexamined Patent Publication No. HEI 7-336325 does not relate to a receiving apparatus for receiving a phase-modulated burst signal used for radio communications. The system is not therefore directed to solving the problem of jitter caused in the demodulation of a burst signal by a synchronous detection system (or a quasi-synchronous detection system). The demodulation system of this embodiment relates to a receiving apparatus for receiving a phase-modulated burst signal by the PSK modulation (digital phase modulation) system for radio communications. This system is therefore directed to solving the problem of jitter caused in the demodulation of a burst signal by a synchronous detection system (or a quasi-synchronous detection system) and has the objective and effect of improving reception sensitivity in radio communications. The demodulation system of this embodiment relates to the switching of the time constants of the loop filters of the demodulation section that receives a phase-modulated burst signal by the PSK modulation (digital phase modulation) system and demodulates the burst signal by the synchronous detection system (or the quasi-synchronous detection system). In a demodulation process using the TDMA-TDD system for processing a phase-modulated burst signal by synchronous detection (or quasi-synchronous detection), there is no such system that includes the switching of time constants of a loop filter. The demodulation system of this embodiment thus configured is allowed to have the effect of minimizing jitter caused by noise and achieving quick pull-in.

INDUSTRIAL APPLICABILITY

According to this embodiment, to the demodulator, which uses the synchronous detection system (or the quasi-synchronous detection system) and for which jitter of frequency deviation and recovery clock is required to be minimized, two or more (desirably three or more) sizes of time constants are applied to be multiplied in the loop filters in the functional blocks performing frequency deviation compensation, bit clock (symbol clock) recovery, etc., so that the time constants may be switched in accordance with the synchronous/asynchronous state, etc. Therefore, quick pull-in may be achieved and jitter may be minimized after the pull-in. Consequently, a quick transition may be allowed from an asynchronous state to a synchronous state, which has the effect of making a transition from a synchronous state to an asynchronous state less likely to occur.

There is another effect of preventing an increase in circuit size because there is no need of a loop filter being provided for each time constant.

Figure 1:
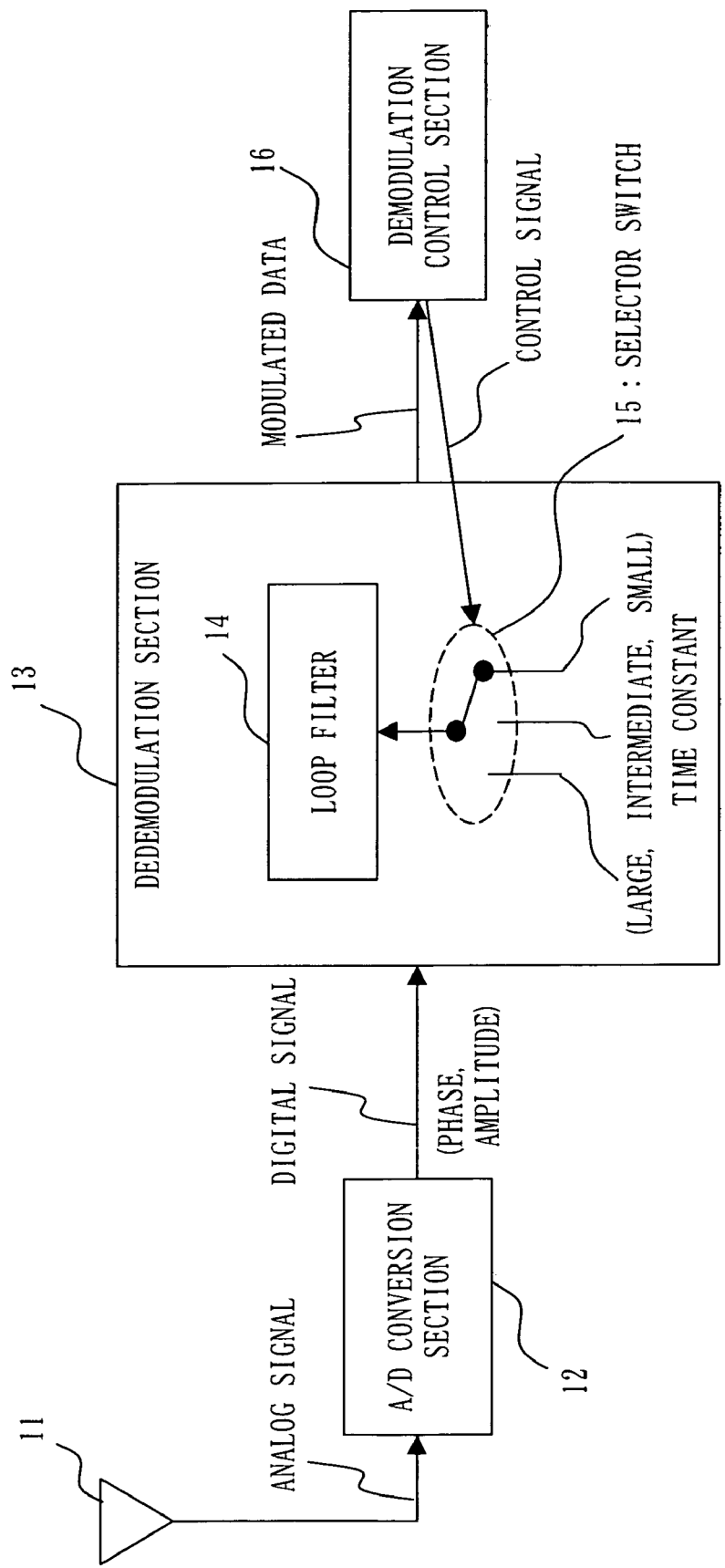
FIG. 1 It is a block diagram illustrating a demodulation section, which is equipped with a loop filter having switchable time constants to be used, and a demodulation control section according to a first embodiment of the present invention.
Figure 2:
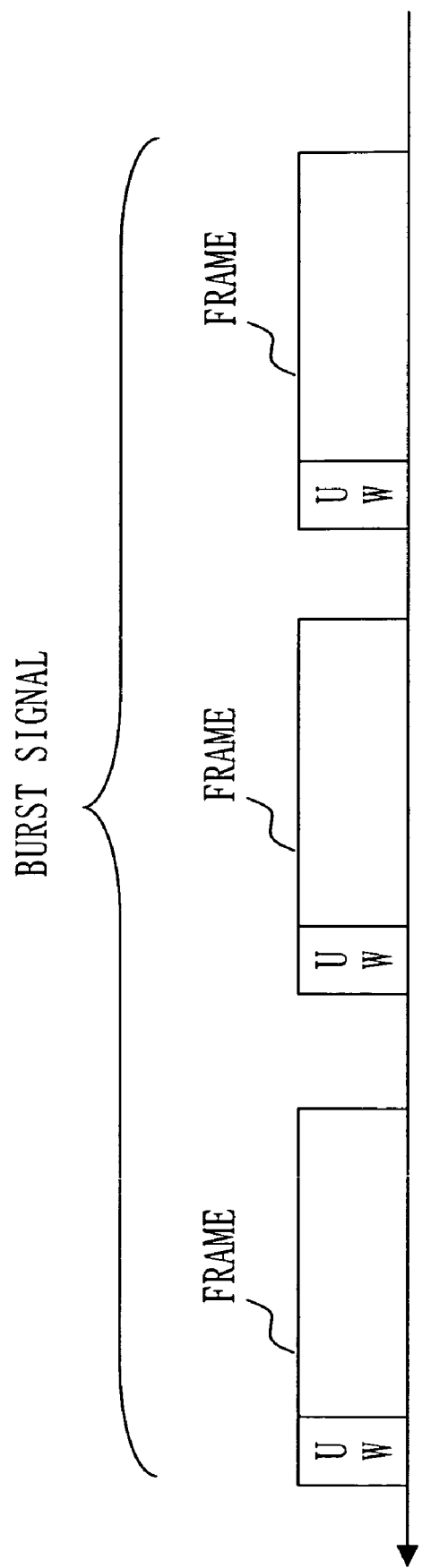
FIG. 2 It is a diagram of a burst signal.
Figure 3:
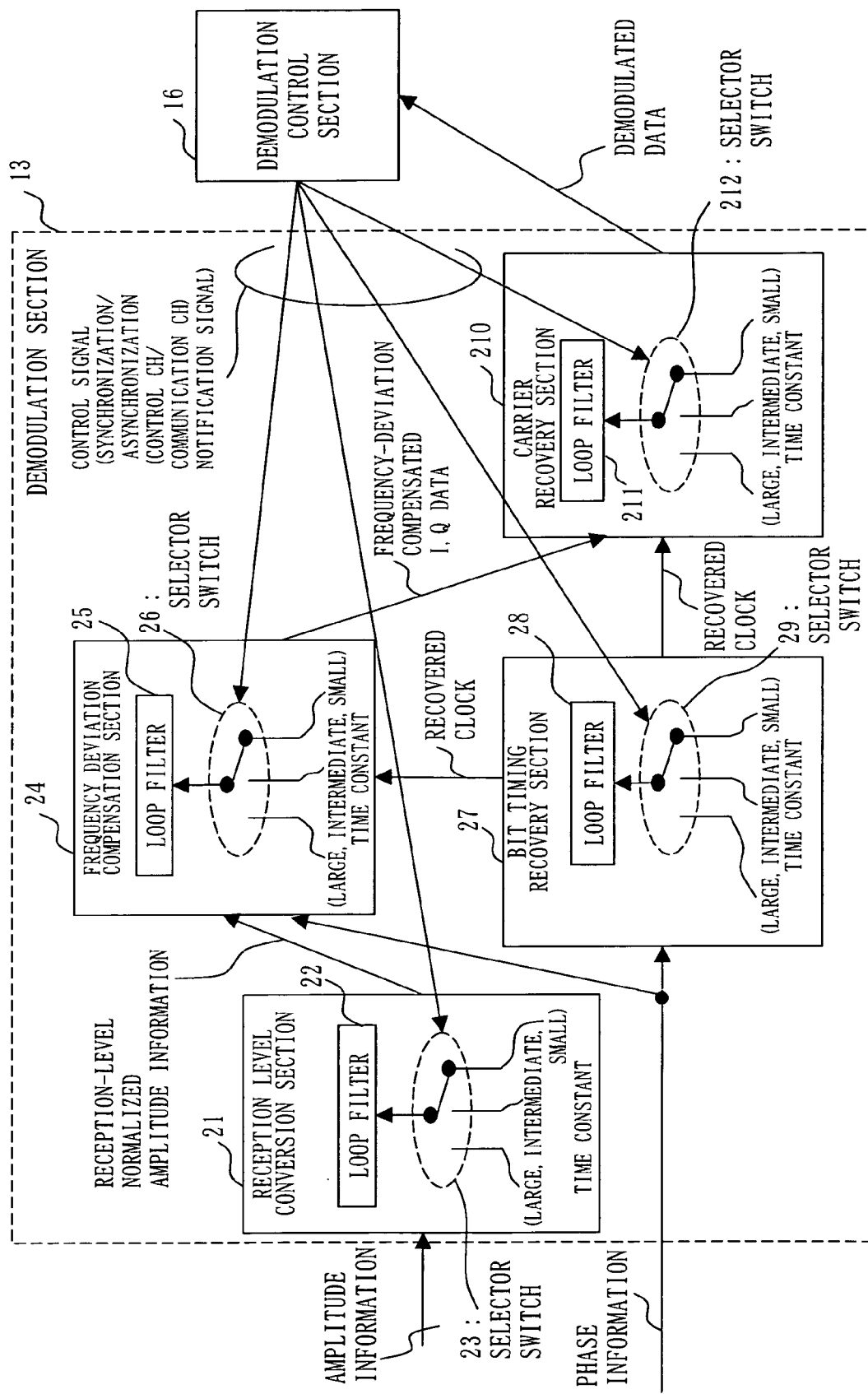
FIG. 3 It is a block diagram of the demodulation system and the demodulation control section shown in FIG. 1 in more detail by adding examples of functional blocks having loop filters in the demodulation section according to the first embodiment of the present invention.
Figure 4:
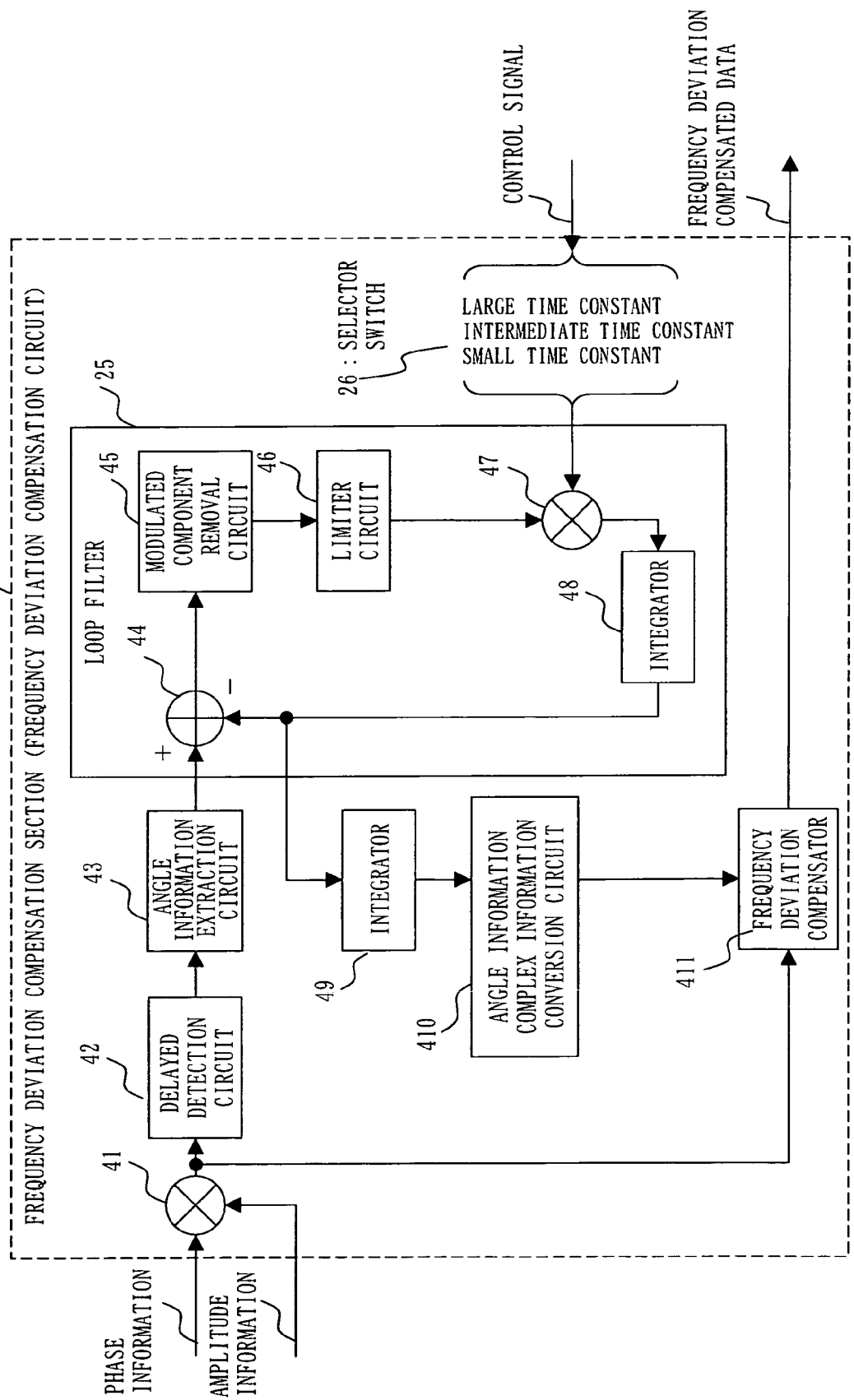
FIG. 4 It is a block diagram of a frequency deviation compensation section (circuit) shown in FIG. 3 according to the first embodiment of the present invention.
Figure 5:
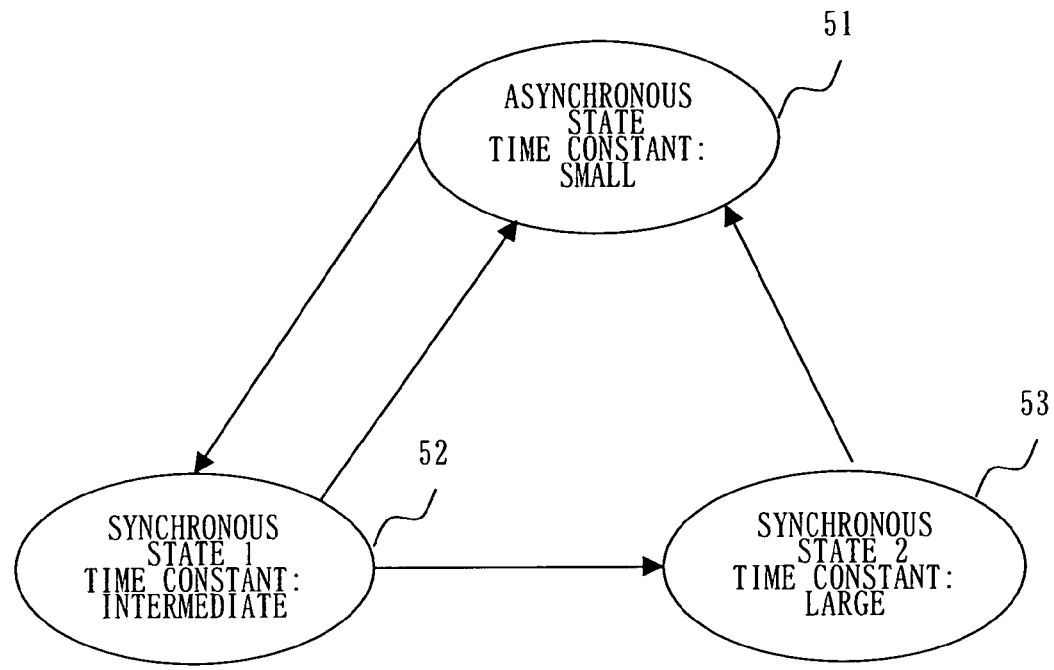
FIG. 5 It is a state transition diagram illustrating one asynchronous state and two synchronous states.
Figure 6:
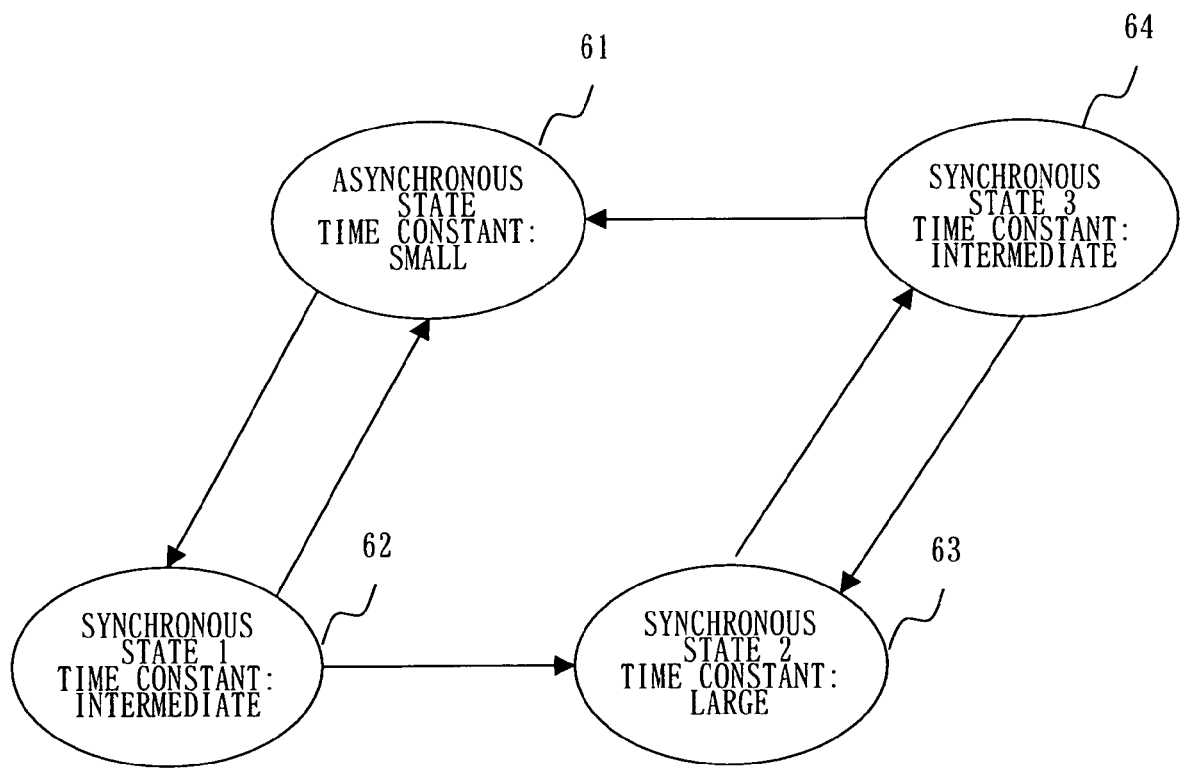
FIG. 6 It is a state transition diagram illustrating one asynchronous state and three synchronous states.
Figure 7:
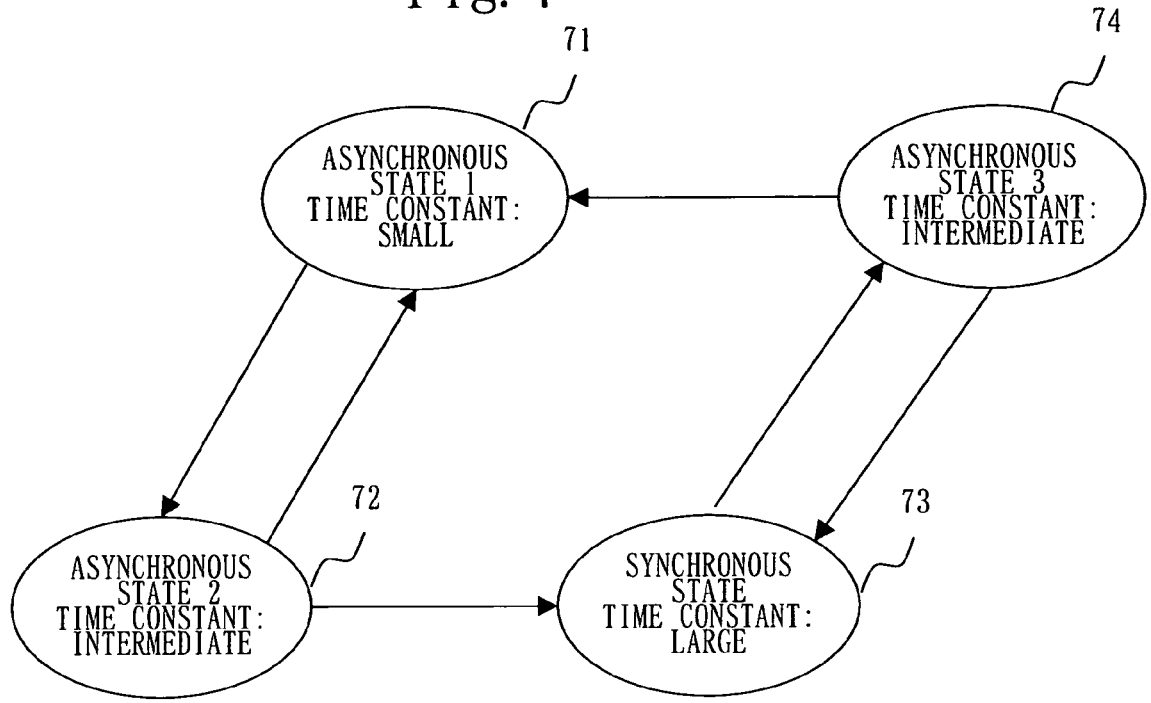
FIG. 7 It is a state transition diagram illustrating three asynchronous states and one synchronous state.
Figure 8:
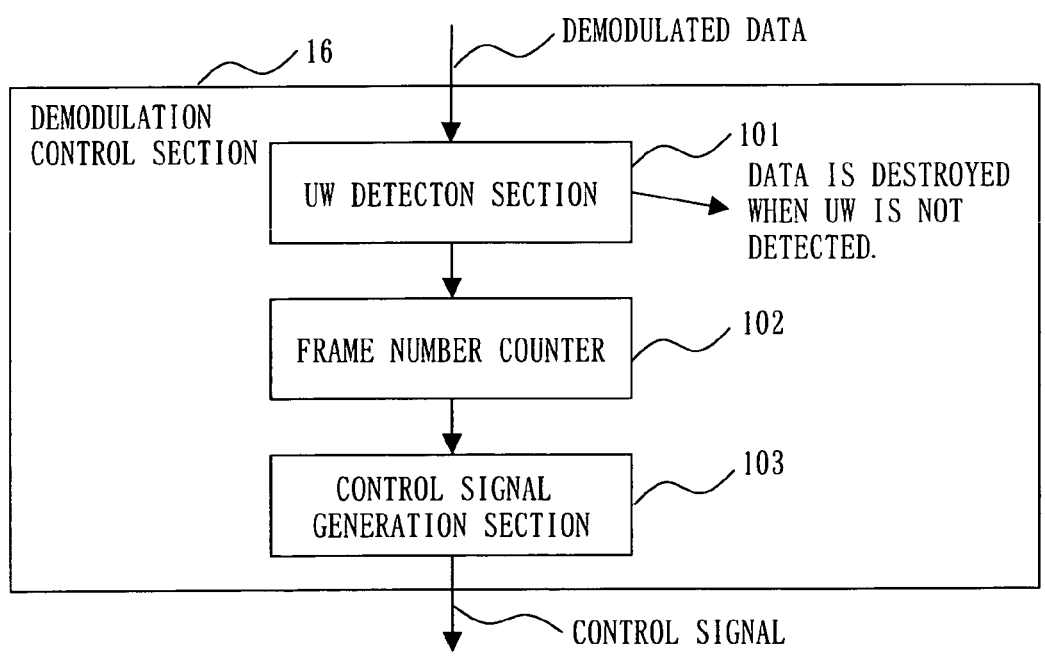
FIG. 8 It is a block diagram of the demodulation control section according to the first embodiment of the present invention.
Figure 9:
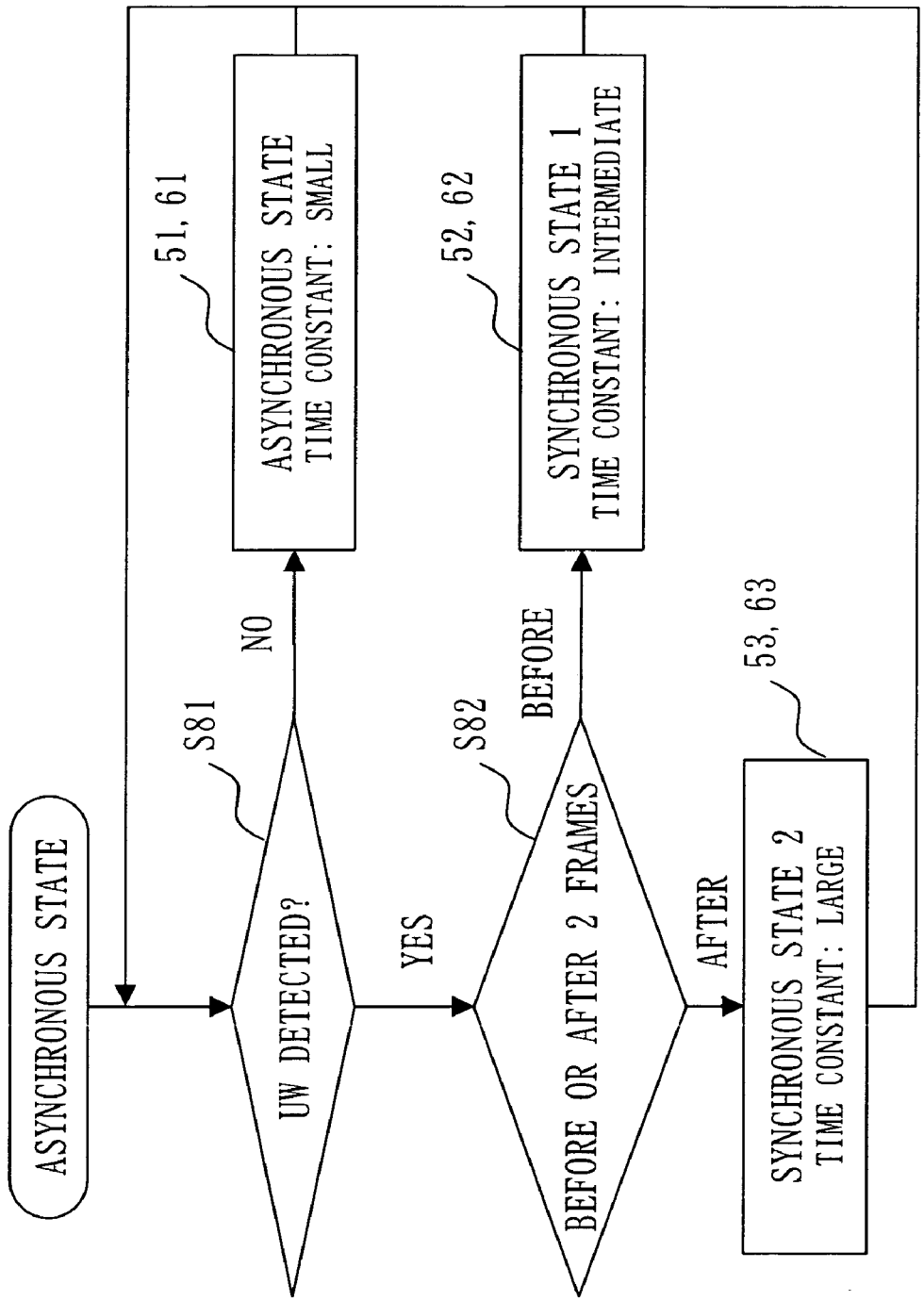
FIG. 9 It is a flow chart for determining the size of the time constant to be used upon transition from a synchronous state to an asynchronous state.
Figure 10:
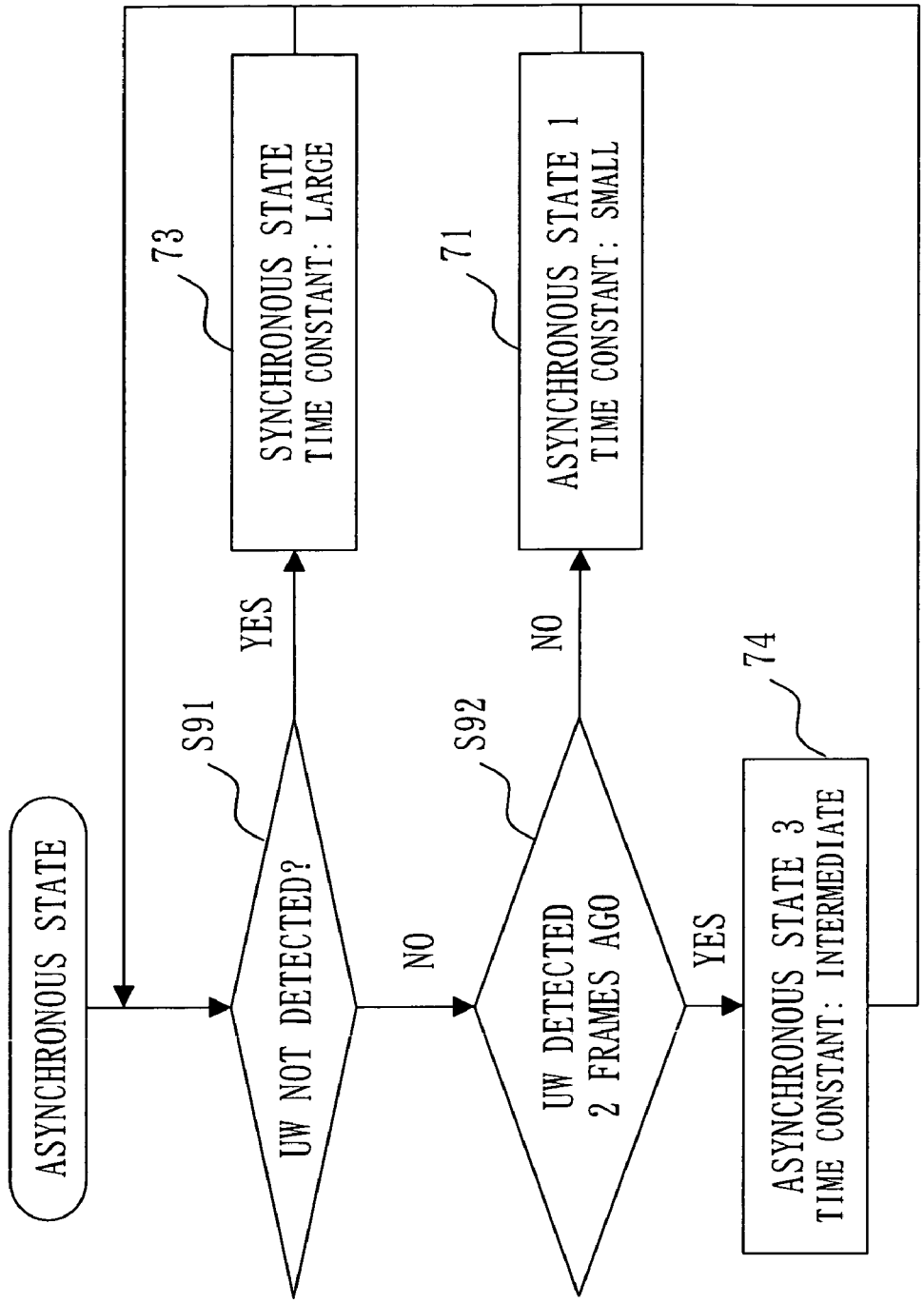
FIG. 10 It is a flow chart for determining the size of the time constant to be used in a period of up to two frames (slots) after transition to an asynchronous state.
Figure 11:
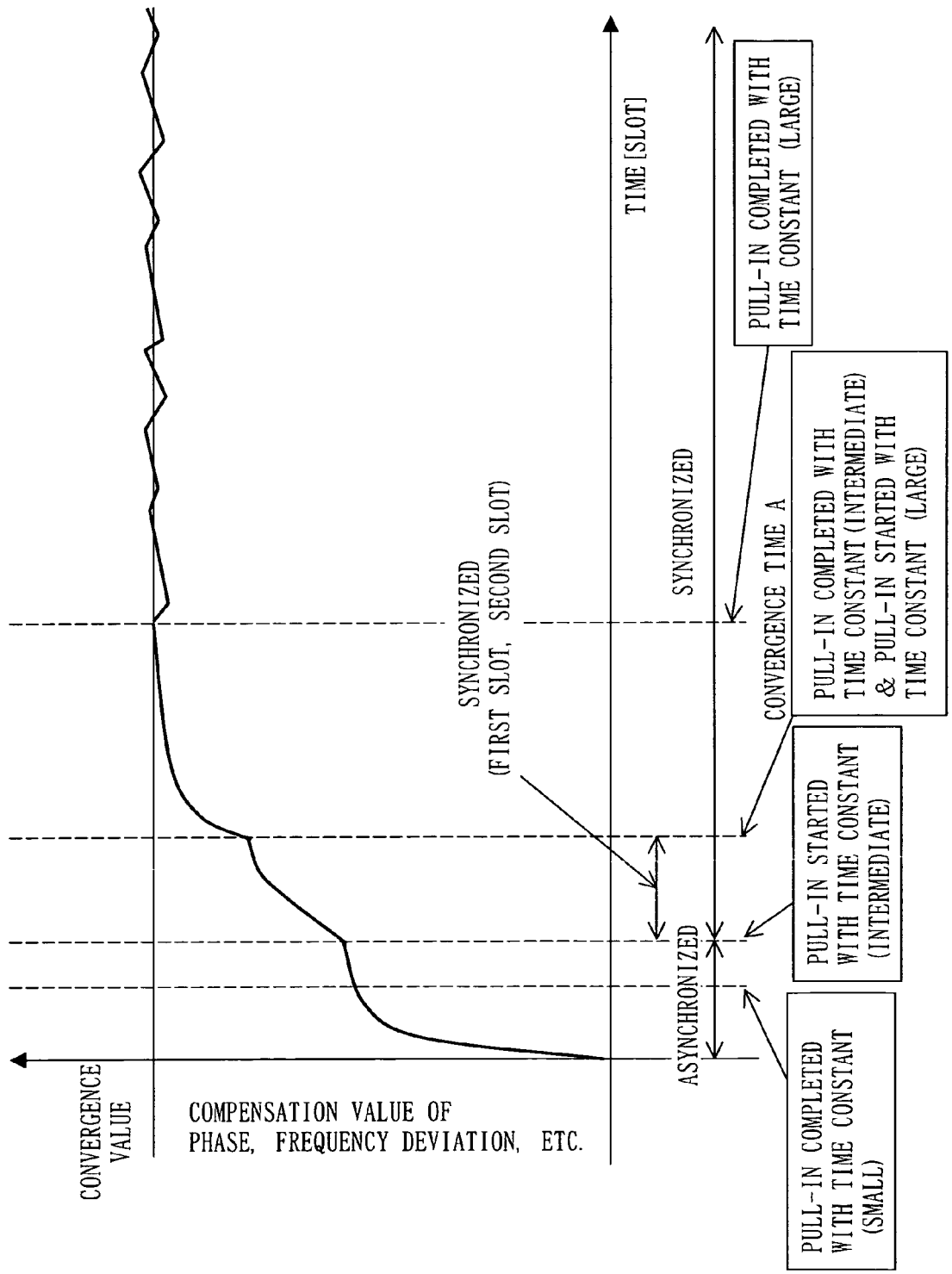
FIG. 11 It is a diagram illustrating a state of convergence when three stages of time constants are used according to the first embodiment of the present invention.
Figure 12:
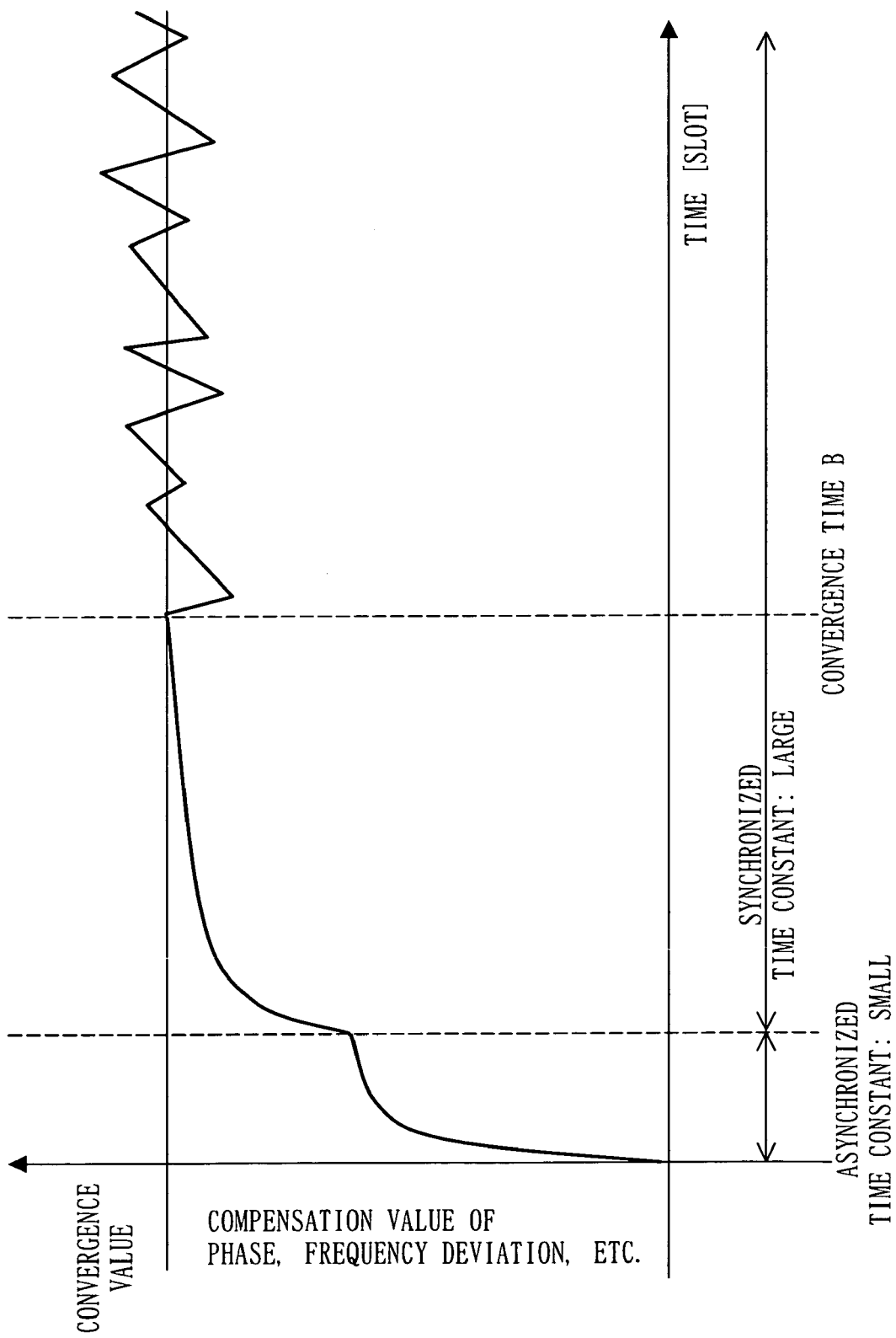
FIG. 12 It is a diagram illustrating a state of convergence when two stages of time constants are used according to the first embodiment of the present invention.

The invention claimed is:

1. A radio communication apparatus, comprising:
a demodulation section that receives a phase-modulated burst signal, and demodulates the burst signal using one of a synchronous detection system and a quasi-synchronous detection system; and
a demodulation control section that generates a control signal to control demodulation of the burst signal in the demodulation section based on a reception state of the burst signal at the demodulation section,
wherein the demodulation section includes,
a filter that filters a signal based on the burst signal using a set time constant, and
a time constant switching section that counts a number of burst signals received after a change in the reception state of the burst signal at the demodulation section and switches a time constant of the filter by the control signal based on a comparison of the number of burst signals received with a predetermined number.

2. The radio communication apparatus of claim 1, wherein the filter is a loop filter in a frequency deviation compensation section that compensates deviation of a frequency of the burst signal.

3. The radio communication apparatus of claim 1, wherein the filter is a loop filter in a carrier recovery section that recovers a carrier wave of the burst signal.

4. The radio communication apparatus of claim 1, wherein the filter is a loop filter in a bit timing recovery section that recovers bit timing of the burst signal.

5. The radio communication apparatus of claim 1, wherein the filter is a loop filter in a reception level conversion section that converts a reception level of the burst signal.

6. The radio communication apparatus of claim 1, wherein the demodulation section further demodulates a burst signal phase-modulated based on a Time Division Multiple Access protocol.

7. The radio communication apparatus of claim 1, wherein
the demodulation control section further detects the reception state of the burst signal at the demodulation section to determine one of three states, a synchronous state, an asynchronous state, and an intermediate state between the synchronous state and the asynchronous state, and outputs the control signal based on the detected reception state, and
the time constant switching section further includes a time constant having a large value for the synchronous state, a time constant having an intermediate value for the intermediate state, and a time constant having a small value for the asynchronous state, and switches the time constants according to the control signal.

8. A radio communication apparatus, comprising:
a demodulation section that receives a phase-modulated burst signal, and demodulates the burst signal using one of a synchronous detection system and a quasi-synchronous detection system; and
a demodulation control section that generates a control signal to control demodulation of the burst signal in the demodulation section based on a reception state of the burst signal at the demodulation section, wherein
the demodulation section includes
a filter that filters a signal based on the burst signal using a set time constant, and
a time constant switching section that switches a time constant of the filter by the control signal based on a comparison of a number of burst signals received with a predetermined number,
the demodulation control section detects the reception state of the burst signal at the demodulation section to determine one of three states, a synchronous state, an asynchronous state, and an intermediate state between the synchronous state and the asynchronous state, and outputs the control signal indicating a detected reception state,
the switching section includes a time constant having a large value for the synchronous state, a time constant having an intermediate value for the intermediate state, and a time constant having a small value for the asynchronous state, and switches the time constants according to the reception state indicated by the control signal, and
the demodulation control section determines as the intermediate state a reception state of a predetermined number of frames or slots of the burst signal at the demodulation section in transition from the asynchronous state to the synchronous state.

9. A radio communication apparatus, comprising:
a demodulation section that receives a phase-modulated burst signal, and demodulates the burst signal using one of a synchronous detection system and a quasi-synchronous detection system; and
a demodulation control section that generates a control signal to control demodulation of the burst signal in the demodulation section based on a reception state of the burst signal at the demodulation section, wherein
the demodulation section includes
a filter that filters a signal based on the burst signal using a set time constant, and
a time constant switching section that switches a time constant of the filter by the control signal based on a comparison of a number of burst signals received with a predetermined number,
the demodulation control section detects the reception state of the burst signal at the demodulation section to determine one of three states, a synchronous state, an asynchronous state, and an intermediate state between the synchronous state and the asynchronous state, and outputs the control signal indicating a detected reception state,
the switching section includes a time constant having a large value for the synchronous state, a time constant having an intermediate value for the intermediate state, and a time constant having a small value for the asynchronous state, and switches the time constants according to the reception state indicated by the control signal, and
the demodulation control section determines as the intermediate state a reception state of a predetermined number of frames or slots of the burst signal at the demodulation section in transition from the synchronous state to the asynchronous state.

10. The radio communication apparatus of claim 1, wherein
the demodulation control section further detects the reception state of the burst signal at the demodulation section based on a signal-to-noise ratio, and outputs the control signal based on the detected reception state, and
the time constant switching section switches the time constant of the filter according to the control signal.

11. A demodulation method in a radio communication apparatus including a demodulation section that receives a burst signal and demodulates the signal by a synchronous detection system using a filter, and a demodulation control section that controls the demodulation section, the method comprising:
the demodulation section:
receiving a digitally phase-modulated burst signal by a time division multiple access system;
the demodulation control section:
detecting the reception state of the burst signal at the demodulation section;
determining one of three states, a synchronous state, an asynchronous state, and an intermediate state between the synchronous state and the asynchronous state based on the detected reception state, the determining of the intermediate state based on a reception state of a predetermined number of frames or slots of the burst signal at the demodulation section in transition from the asynchronous state to the synchronous state or a reception state of a predetermined number of frames or slots of the burst signal at the demodulation section in transition from the synchronous state to the asynchronous state;
generating a control signal to control a time constant of the filter in the demodulation section based on a reception state of the burst signal at the demodulation section, the reception state indicating whether the burst signal is synchronous or asynchronous; and
the demodulation section:
switching the time constant of the filter based on the control signal and filtering a signal based on the burst signal, wherein the switching includes switching the time constant to a large value for the synchronous state, a small value for the asynchronous state, and an intermediate value for the intermediate state.

12. A radio communication apparatus, comprising:
a time constant switching section that counts a number of burst signals received after a change in a reception state of the burst signal at a demodulation section and selects a time constant based on a comparison of the number of burst signals received with a predetermined number, and
a loop filter that filters a signal based on the burst signal by using the time constant selected by the time constant switching section.

13. The radio communication apparatus of claim 1, wherein
the demodulation control section determines the reception state of the burst signal at the demodulation section to determine one of a synchronous state and an asynchronous state and generates a control signal to switch the time constant of the filter to a larger value when the demodulation control section determines a state transition of the demodulation section from the asynchronous state to the synchronous state, and
the time constant switching section, when the demodulation control section generates the control signal to switch the time constant of the filter to the larger value, switches the time constant of the filter to an intermediate value that is larger than the time constant of the filter at a time when the reception state of the burst signal at the demodulation section is the asynchronous state, begins counting a number of burst signals received after switching the time constant of the filter to the intermediate value, and, when the counted number of the burst signals reaches the predetermined number, switches the time constant of the filter to a larger value than the intermediate value.

14. The radio communication apparatus of claim 1, wherein
the demodulation control section determines the reception state of the burst signal at the demodulation section to determine one of a synchronous state and an asynchronous state and generates a control signal to switch the time constant of the filter to a smaller value when the demodulation control section determines a state transition of the demodulation section from the synchronous state to the asynchronous state, and
the time constant switching section, when the demodulation control section generates the control signal to switch the time constant of the filter to the smaller value, switches the time constant of the filter to an intermediate value that is smaller than the time constant of the filter at a time when the reception state of the burst signal at the demodulation section is the synchronous state, begins counting a number of burst signals received after switching the time constant of the filter to the intermediate value, and, when the counted number of the burst signals reaches the predetermined number, switches the time constant of the filter to a smaller value than the intermediate value.

15. A demodulation method in a radio communication apparatus including a demodulation section that receives a burst signal and demodulates the signal by a synchronous detection system using a filter, and a demodulation control section that controls the demodulation section, the method comprising:
the demodulation section:
receiving a digitally phase-modulated burst signal by a time division multiple access system;
the demodulation control section:
detecting the reception state of the burst signal at the demodulation section;
determining one of three states, a synchronous state, an asynchronous state, and an intermediate state between the synchronous state and the asynchronous state based on the detected reception state, the determining of the intermediate state based on a reception state of a predetermined number of frames or slots of the burst signal at the demodulation section in transition from the asynchronous state to the synchronous state;
generating a control signal to control a time constant of the filter in the demodulation section based on a reception state of the burst signal at the demodulation section, the reception state indicating whether the burst signal is synchronous or asynchronous; and
the demodulation section:
switching the time constant of the filter based on the control signal and filtering a signal based on the burst signal, wherein the switching includes switching the time constant to a large value for the synchronous state, a small value for the asynchronous state, and an intermediate value for the intermediate state.

16. A demodulation method in a radio communication apparatus including a demodulation section that receives a burst signal and demodulates the signal by a synchronous detection system using a filter, and a demodulation control section that controls the demodulation section, the method comprising:
the demodulation section:
receiving a digitally phase-modulated burst signal by a time division multiple access system;
the demodulation control section:
detecting the reception state of the burst signal at the demodulation section;
determining one of three states, a synchronous state, an asynchronous state, and an intermediate state between the synchronous state and the asynchronous state based on the detected reception state, the determining of the intermediate state based on a reception state of a predetermined number of frames or slots of the burst signal at the demodulation section in transition from the synchronous state to the asynchronous state;
generating a control signal to control a time constant of the filter in the demodulation section based on a reception state of the burst signal at the demodulation section, the reception state indicating whether the burst signal is synchronous or asynchronous; and
the demodulation section:
switching the time constant of the filter based on the control signal and filtering a signal based on the burst signal, wherein the switching includes switching the time constant to a large value for the synchronous state, a small value for the asynchronous state, and an intermediate value for the intermediate state.

* * * * *